United States Patent [19]

Holding

[11] 4,325,902
[45] Apr. 20, 1982

[54] METHOD OF MANUFACTURE OF BRUSH COMPONENTS

[75] Inventor: David Holding, Bolton, England

[73] Assignee: Schlegel (UK) Limited, Leeds, England

[21] Appl. No.: 165,790

[22] Filed: Jul. 3, 1980

[51] Int. Cl.³ .............................................. B29D 31/00
[52] U.S. Cl. .................................... 264/146; 264/157; 264/167; 264/174; 264/243; 264/295; 300/21
[58] Field of Search .................. 425/80; 264/243, 248, 264/103, 146, 174; 300/19, 21; 264/157, 167, 295

[56] References Cited

U.S. PATENT DOCUMENTS

| 2,294,480 | 9/1942 | Rohweder et al. | 300/21 |
| 2,363,685 | 11/1944 | Neuschaefer | 300/21 |
| 2,812,214 | 11/1957 | Sandelin | 425/805 |
| 2,980,467 | 4/1961 | Lichene | 300/21 |
| 3,351,387 | 11/1967 | Lichene | 300/21 |
| 4,133,147 | 1/1979 | Swift | 300/21 |

FOREIGN PATENT DOCUMENTS 1457074 12/1976 United Kingdom .

Primary Examiner—James B. Lowe
Attorney, Agent, or Firm—Cumpston & Shaw

[57] ABSTRACT

Methods of manufacturing brush components are disclosed in which a plurality of predetermined lengths of brush bristle formed of synthetic resinous material are fed from a supply into the nip of at least one pair of endless haul-off belts so that the bristles are arranged substantially uniformly and parallel to each other with their ends in line. In one construction a single pair of haul-off belts having a width which is less than the bristles is used, the bristles projecting beyond the sides of the belts, and the thus formed bristle array is fed into an extruder whereupon a plastics material is extruded over the projecting ends of the bristles to hold them together and/or the ends are fused together, the resultant product, on emerging from the ends of the belts, then being slit centrally to provide two endless components. In another construction, two spaced pairs of belts are used to advance the bristles into an extruder and plastics material is extruded down the center of the bristles either from each side or in sufficient amounts to penetrate between the bristles completely, whereupon on emerging from the belts the bristles are either folded about the central extrusion through 180°, whereupon the extrusion is allowed to cool, or are slit centrally of the extrusion to provide two components. In all the constructions, the bristles are heated prior to or during the extrusion, and hence soften or are fused together.

15 Claims, 12 Drawing Figures

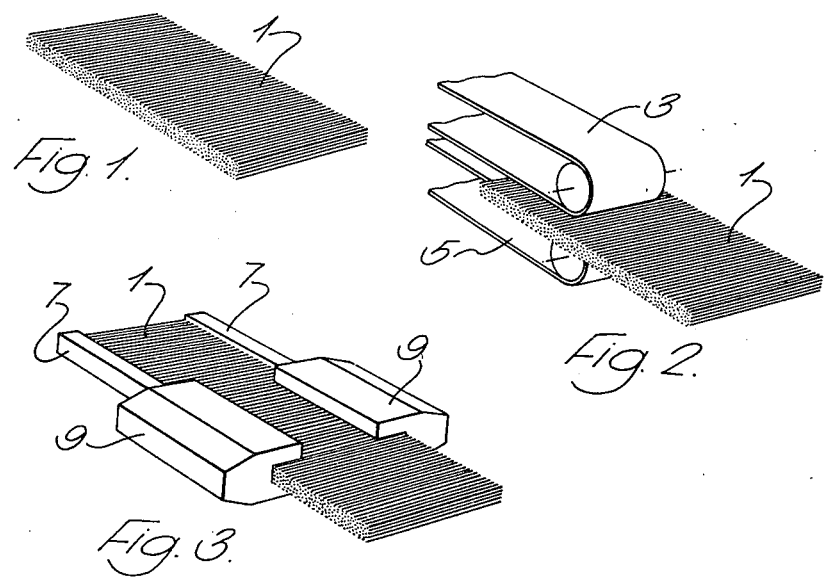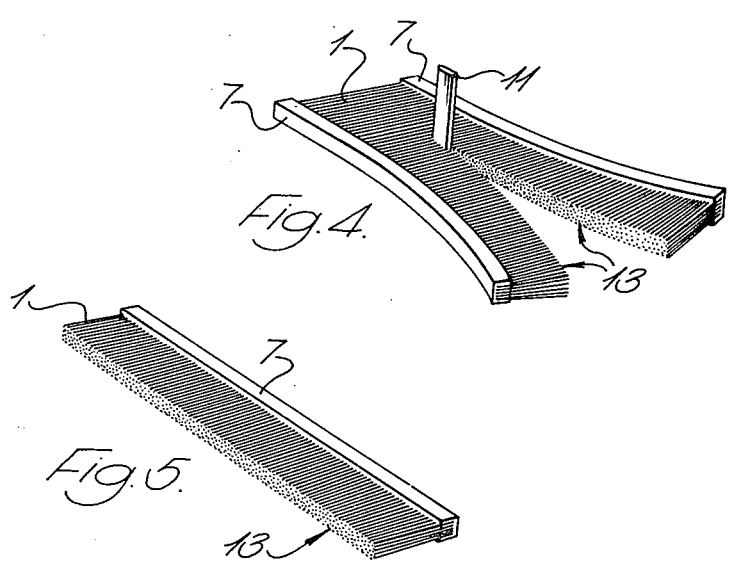

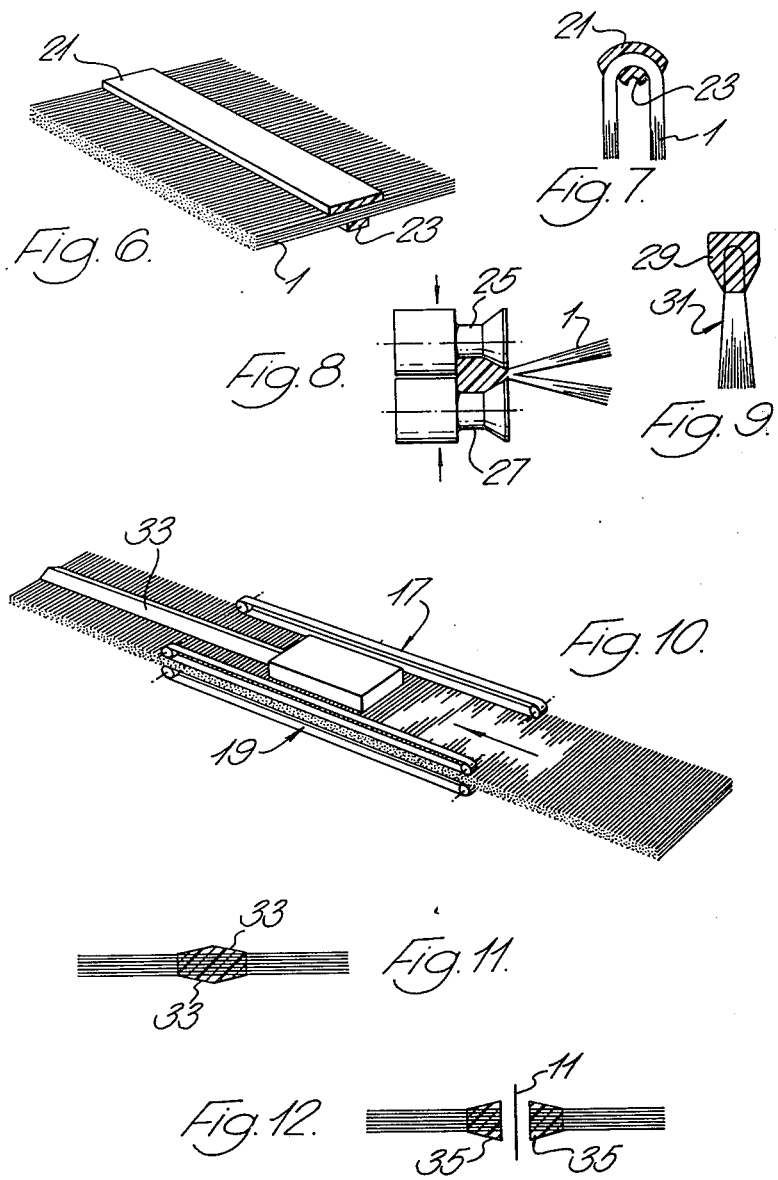

METHOD OF MANUFACTURE OF BRUSH COMPONENTS

This invention relates to improved methods of manufacturing brush components, the components themselves, and brushes made from the components.

In U.K. patent specification No. 730131, a method of manufacturing brush strips is disclosed wherein an organic material is heated to plastic state and is extruded through a mouthpiece into a continuous U-shaped strip through a groove-shaped guide member, whereupon a plurality of aligned bristles are conveyed by means of an endless belt together with a thread of metal and are folded around a guide cam and led into the open-topped guide member. The guide member has a tapering slot in its upper surface at the bristle feed-in location, and as the bristles are advanced and the U-shaped strip is pulled out of the guide member, so the bristles are folded with their ends upwards by the narrowing slot, and pressed down into the U-shaped strip. In this way, the side walls of the U-shaped strip are pressed against the bristles which are partly pressed into the soft material of the strip and held therein. It is preferred that the strip is cooled on emergence from the extruder so that it maintains its shape better.

Brush strips made in accordance with the above teachings are wholly unsatisfactory in that, due to the low temperature of the U-shaped strip, the bristles are only pressed into its surface and cannot even form a satisfactory mechanical key with the strip. This means that after a few uses, the bristles tend to fall out of the strip.

In our U.S. Pat. No. 4,133,147, another method of manufacturing brush strips is disclosed wherein a plurality of endless filaments are formed into a filament bundle, the bundle is folded upon itself into a zig-zag formation and a plurality of threads are then knitted into the zig-zag formation so as to hold it together with adjacent arms of the zig-zag attached together by the threads. A locking device which may be an extruded bead is then located on each side edge of the zig-zag formation so as to form a mechanical bond therewith, and to provide two brush strips the zig-zag formation is slit down its centre.

Brushes made in accordance with the teachings of this specification are satisfactory but because only a mechanical interlock is provided between the bead and edges of the zig-zag formation, it is essential to have a knitted zig-zag formation with U-shaped portions along each side edge, otherwise the bristles can pull out of the brush strip during use.

Accordingly, one disadvantage of this method of manufacture is the necessity to have to provide specially knitted zig-zag formations of endless filaments.

In U.K. patent specification No. 195679, endless belts are disclosed for transporting cut bristles from one location to another.

In U.K. patent specification No. 610657 brush strips are shown formed from cut bristles but the bristles are held in the form of a strip by bands of metal located on either side of the bristles and clamped together.

It is the object of the present invention to provide a brush manufacturing method which overcomes the disadvantages of the prior art and allows brush components to be manufactured using cut bristles by a quick and largely automatic method which is relatively cheap to operate.

According to the present invention, we provide a method of manufacturing a brush component comprising feeding a plurality of predetermined lengths of synthetic resinous brush bristle from a supply into the nip of at least one pair of endless haul-off belts so that said bristles are arranged in an adjacent array substantially parallel to each other with their ends substantially in line, the array being of substantially uniform thickness and density, passing the array through an extruder, heating the array along its length so as to at least soften the bristles in a predetermined area, extruding synthetic resinous material onto both sides of the array along its length over said predetermined area so as to penetrate between any unfused bristles in said area and so as to hold the bristles together, and folding or slitting the bristles substantially along the centre of the array after they emerge from the extruder to provide said brush component or components.

Preferably, the ends of the bristles are tamped to give a uniform width and to align them prior to passing them from a feeder into the nip of the haul-off belts.

Preferably, the synthetic resinous material is a thermoplastic material which is cooled so as to set prior to the slitting operation taking place.

Preferably also, the material is the same material as that of the bristles.

Preferably, the bristles are heated to a temperature which is sufficient to fuse them together prior to the extrusion step.

In one form of the invention, a single pair of haul-off belts grip the array of bristles centrally so that the ends of the bristles project beyond the edges of the belt and a strip of synthetic resinous material is extruded along and around the two side edges of the array so as to hold the respective ends of the bristles together, whereupon, on emergence from the nip, the bristles are slit centrally to form two continuous brush components.

According to a second form of the invention, the bristles are fed into the nip of two spaced pairs of haul-off belts which respectively support the array of bristles along the two edges of the array, that is support the two ends of the bristles, whereupon two beads of synthetic resinous material of different widths are extruded along the centre line of the array of bristles, one bead being located on one side of the array and the other on the opposite side, and while the synthetic resinous beads are still soft, the array of bristles is folded upon itself along the line of the beads with the wider bead outermost, the folded bristle array and beads being passed through a forming roller, whereupon the soft material is cooled and allowed to harden.

Preferably, the bristles are partly or completely impregnated with the resinous material at the extrusion stage. However, when the array is passed through the forming roller, impregnation will occur, or be completed. Of course, where the heating step causes complete fusion, impregnation can only occur around the fused portion.

According to a third form of the invention, the bristles are fed into the nip of two spaced pairs of haul-off belts which support the ends of the bristles, whereupon equal volumes of synthetic resinous material are extruded onto the two faces of the bristle array along its centre line between the pairs of haul-off belts at a pressure sufficient to penetrate and impregnate the array of bristles, whereupon the synthetic resinous material is allowed to cool and the array is then slit centrally down the centre line of the synthetic resinous material so as to provide two continuous brush components.

The invention also extends to brush components when made by any of the above-described methods and to brushes formed from said brush components, and to the manufacturing apparatus.

The invention is now described by way of example with reference to the accompanying schematic drawings, in which:

FIG. 1 is a perspective view of an array of bristles;

FIG. 2 is a perspective view showing the array of bristles passing into the nip of a pair of haul-off belts in accordance with a first form of the invention;

FIG. 3 is a perspective view showing a split extrusion die extruding beads of material onto and around the two edges of the array;

FIG. 4 is a perspective view showing the array being slit centrally;

FIG. 5 is a perspective view of one of the brush components manufactured in accordance with the steps shown in FIGS. 1–4;

FIG. 6 is a view similar to FIG. 3 showing an alternative extrusion operation in accordance with a second form of the invention;

FIG. 7 is an end view showing the array of bristles after a subsequent folding operation;

FIG. 8 is an end view showing the folded array of bristles being passed through forming rollers;

FIG. 9 is an end view showing the brush component formed by the method of FIGS. 6–8;

FIG. 10 is a perspective view showing the array of bristles passing through two spaced pairs of haul-off belts suitable for the second and a third form of the invention;

FIG. 11 is an end view of an array of bristles after beads of material have been extruded centrally of the array of bristles in accordance with the third form of the invention; and FIG. 12 shows two brush components which result after the array shown in FIG. 11 has been slit in two.

Referring to the drawings, and in particular to FIGS. 1–5, a plurality of brush bristles formed of synthetic resinous material of predetermined length are fed from a hopper (not shown) into a channel (not shown) so as to form an array of bristles 1 of uniform thickness and density as shown in FIG. 1. If necessary, the edges of the bristles can be tamped so that they are all in alignment. The bristles are then hauled out of the channel and into the nip of a pair of endless haul-off belts 3, 5, of known construction. The belts 3, 5 have a width less than the length of the bristles so that the ends of the bristles project beyond the side edges of the belts as shown in FIG. 2, and while still in the nip of the haul-off belts 3, 5, a bead of synthetic resinous material 7, e.g. a thermoplastic bead, is extruded onto the two projecting ends of the bristles using a split extrusion die 9. During passage through the extruder, the side edges of the array are heated to a temperature sufficient at least to soften the bristles, and preferably to a temperature sufficient to fuse them together. While still in this soft or molten state, the beads 7 are extruded onto the edges, and if the beads are of the same synthetic resinous material as the bristles, they will fuse completely with the bristles. It has been found that best results are obtained by heating to fusion temperature, otherwise the bristles act as a heat sink, and a good bond between the beads 7 and bristles is not achieved. The beads 7 are subsequently cooled so as to lock the array of individual bristles into a permanent fixed position and after passing out of the nip of the belts 3, 5, the bristle array with both edges held firm by the thermoplastic beads is passed through a slitting machine and the bristles are cut centrally down the length of the array as shown in FIG. 4 to form two continuous lengths of brush component 13 (see FIGS. 4 and 5).

In the alternative form of the invention shown in FIGS. 6–9, an array of bristles is formed in the same manner as described with reference to the previous form of the invention and the array is hauled from the channel by means of two spaced pairs of haul-off belts 17, 19 (see FIG. 10), so that just the two edges of the array, i.e. the ends of the bristles, are contacted by the belt nips. Again, the array is passed through an extruder, and as before, is heated along the centre of the array, whereupon a wide bead of synthetic resinous material 21 is extruded centrally on one face of the array and on the opposite face a narrow bead 23 is extruded (see FIG. 6), both the beads preferably being of thermoplastic material (preferably the same as that of the bristles). While the thermoplastic beads and bristles are still molten, the array of bristles is folded upon itself as shown in FIG. 7 into a generally U-shaped form so that the wide bead is on the outside and the narrow bead on the inside, whereupon the folded array is passed through the nip of a pair of forming rollers 25, 27 so as to form the two beads into the shape shown in FIG. 9. The beads are subsequently allowed to cool. Effectively, the two beads impregnate the bristles and/or are fused with the fused bristles and become a single bead 29 suitably shaped to locate the subsequent brush component 31 in a suitable channel.

In the third form of the invention, the array of bristles is formed and hauled off from the feeder channel in the same manner as for the second form of the invention and is passed into an extruder, heated and equal volumes of synthetic resinous material 33 are extruded onto the top and bottom surfaces of the array of bristles along the centre line of the bristles, as shown in FIG. 11, at a temperature and pressure sufficient to penetrate and impregnate and/or fuse with the bristles in the array. After the extrusion operation, the extrusions are allowed to cool, whereupon the bristle array is slit centrally down the centre of the extrusions 33 using a slitting knife 11. It will thus be appreciated that the extrusions 33 are shaped and sized so that the resultant locking beads 35 are of sufficient height and the correct shape to locate the thus formed brush components in a re-entrant holding channel.

It will be appreciated that in all forms of the present invention, the shape of the extrusions can be chosen for locating the brush component in a suitable locking groove, for example, on a brush body with a handle or in a domestic appliance such as a vacuum cleaner, and that the required length of brush component can be obtained merely by cutting it off from the endless length of component.

If desired, the brush component can be strengthened and be caused to conform to various shapes by inserting a length of wire or other coated or uncoated strengthening material, e.g. yarn, polymer rods, strips or the like which could be resiliently deformable, into the extrusions. Where the extrusions are down the side edges of the bristle array, it would be a simple matter to insert a length of wire internally of the extrusion and in the second form of the invention the wire could be provided in the bead 21 or in the bead 23 or possibly in both beads. In the third form of the invention it is envisaged that at least two wires would be required suitably located so that at least one wire was arranged in one of the brush components and at least one was arranged in the other brush component after the slitting operation.

While extrusion has been described as the method by which the bristle arrays are held together, it will be appreciated that if the bristles are formed of a thermosetting synthetic resinous material, they could be held together by fusing. In this instance a fusion head could replace the extrusion head, and instead of extruding strips along the length of the array of bristles, they could be fused together. It is preferred that the bristles are formed from polymer monofilament, although other materials could be used.

Of course, the fusing technique (i.e. heating) can be used in conjunction with extrusion.

In the above description with reference to the drawings, the bristles have been loosely advanced by the haul-off belts. It is envisaged, however, that they could be held together by knitting warps around pre-selected groups of bristles, continuously. An equivalent product could be obtained by taking the zig-zag formation disclosed in our U.K. Pat. No. 1457074, cutting off the loops down each side edge, and feeding the resultant product to the haul-off belts.

What is claimed is:

1. A method of manufacturing a brush component comprising feeding a plurality of predetermined lengths of brush bristle formed of a first synthetic resinous material from a supply into the nip of at least one pair of endless haul-off belts so that said bristles are arranged in an adjacent longitudinally extending array substantially parallel to each other with their ends substantially in line, the array being of substantially uniform thickness and density, passing the array of bristles between two extrusion dies, heating an area of the array along the length of the array of bristles as the array is advanced past the extrusion dies so as at least to cause outer surface portions of said heated bristles to melt, extruding layers of a second synthetic resinous material onto both sides of said area along the length of the array of bristles as the array is advanced past the extrusion dies so as to penetrate between the bristles and to hold them together, the first and second synthetic resinous materials being sufficiently compatible so that they will fuse with each other during this extruding step, and slitting the bristles substantially along the centre of the array after they emerge from the extruder to provide at least one brush component.

2. A method as claimed in claim 1 wherein a single pair of haul-off belts grip the array of bristles centrally so that the ends of the bristles project beyond the edges of the belts and strips of the second synthetic resinous material are extruded along the two side edges of the array so as to fix the respective ends of the bristles to adjacent bristle ends, whereupon, on emergence from the nip, the bristles are slit centrally to form two continuous brush components.

3. A method according to claim 1 wherein the second synthetic resinous material is a thermoplastic material which is the same material as that from which the bristles are made.

4. A method according to claim 1 wherein the bristles are fed into the nip of two spaced pairs of haul-off belts which support the ends of the bristles, whereupon equal volumes of the second synthetic resinous material are extruded onto the two faces of the bristle array along its centre line between the pairs of haul-off belts at a pressure sufficient to penetrate and impregnate the array of bristles, whereupon the second synthetic resinous material is allowed to cool and the array is then slit centrally down the centre line of the second synthetic resinous material so as to provide two continuous brush components.

5. A method according to claim 1 wherein at least one strip of strengthening material is incorporated in each layer of second resinous material so that at least one such strip of strengthening material is incorporated in each brush component.

6. A method according to claim 5 wherein the strengthening material is wire.

7. A method according to claim 6 wherein the wire is coated with a synthetic resinous polymeric material prior to its incorporation in each extruded layer.

8. A method of manufacturing a brush component comprising feeding a plurality of predetermined lengths of brush bristles formed from a first synthetic resinous material from a supply into the nip of at least one pair of endless haul-off belts so that said bristles are arranged in an adjacent longitudinally extending array substantially parallel to each other with their ends substantially in line, the array being of substantially uniform thickness and density, passing the array between two extrusion dies, heating the array along its length on both sides at a central location as the array is advanced past the extrusion dies so as at least to cause outer surface portions of said heated bristles to melt in this location, extruding a second synthetic resinous material on both sides of the array at said central location as the array is advanced past the extrusion dies and over the melted bristles so as to penetrate between the bristles and to hold them together, the first and second synthetic resinous materials being sufficiently compatible so that they will fuse with each other during this extruding step, and folding the bristles substantially along the centre of the array after they emerge from between the extrusion dies to provide said brush component.

9. A method as claimed in claim 8 wherein the ends of the bristles are tamped to give a uniform width and to align them prior to passing them from a feeder into the nip of the haul-off belts.

10. A method according to claim 8 wherein the second synthetic resinous material is a thermoplastic material which is the same material as that of the bristles.

11. A method according to claim 8 wherein the bristles are fed into the nip of two spaced pairs of haul-off belts which respectively support the array of bristles along the two edges of the array, whereupon two beads of the second synthetic resinous material of different widths are extruded along the centre line of the array of bristles, one bead being located on one side of the array and the other on the opposite side, and while the synthetic resinous beads are still soft, the array of bristles is folded upon itself along the line of the beads with the wider bead outermost, the folded bristle array and beads being passed through a forming roller, whereupon the molten material is cooled.

12. A method according to claim 11 wherein the array of bristles is impregnated with the second resinous material at the extrusion stage.

13. A method according to claim 11 wherein a strengthening material is incorporated in one bead of second resinous material so that at least one such length of strengthening material is incorporated in each brush component.

14. A method according to claim 13 wherein the strengthening material is wire.

15. A method according to claim 14 wherein the wire is coated with a synthetic resinous polymeric material prior to its incorporation in an extruded bead.

* * * * *